United States Patent [19]

Parkin

[11] Patent Number: 5,794,939

[45] Date of Patent: Aug. 18, 1998

[54] THIN FACED BALANCED SEAL

[75] Inventor: Andrew John Parkin, Rotherham, United Kingdom

[73] Assignee: AES Engineering, Ltd., Rotherham, United Kingdom

[21] Appl. No.: 584,051

[22] Filed: Jan. 11, 1996

[30] Foreign Application Priority Data

Jan. 9, 1995 [GB] United Kingdom ............... 9500340

[51] Int. Cl.⁶ ............................................. F16J 15/34
[52] U.S. Cl. ............................................. 277/81 R
[58] Field of Search ........................... 277/81 R, 38, 277/53, 85

[56] References Cited

U.S. PATENT DOCUMENTS 5,378,000  1/1995  Orlowski ................................ 277/53

FOREIGN PATENT DOCUMENTS 2047821  12/1980  United Kingdom ............... 277/81 R

*Primary Examiner*—Scott Cummings
*Attorney, Agent, or Firm*—Frost & Jacobs

[57] ABSTRACT

A mechanical seal 30 is disclosed comprising a sleeve 32 which is adapted to be affixed to the shaft 34 of a item of mechanical equipment, together with a rotary component 42 which carries a rotary seal face 44. Two O-ring grooves 46, 48 are provided on the sleeve 32, the first 46 being remote from the rotary seal face 44 and cut somewhat deeper into the sleeve 32 than the second 48. The rotary component 42 has a first region 50 remote from the rotary seal face 44, the inner surface of which has a relatively small diameter and a second region 52 between the first region 50 and the rotary seal face 44, the inner surface of which has a larger diameter. A pair of O-rings 54, 56 are located in the O-ring grooves 46, 48 and seal against the inner surface of the rotary component 42. The net thrust, if any, acting on the rotary component 42 and hence on the rotary seal face 44 tends to close the seal face irrespective of whether the barrier fluid pressure is in excess for less than the product pressure.

20 Claims, 1 Drawing Sheet

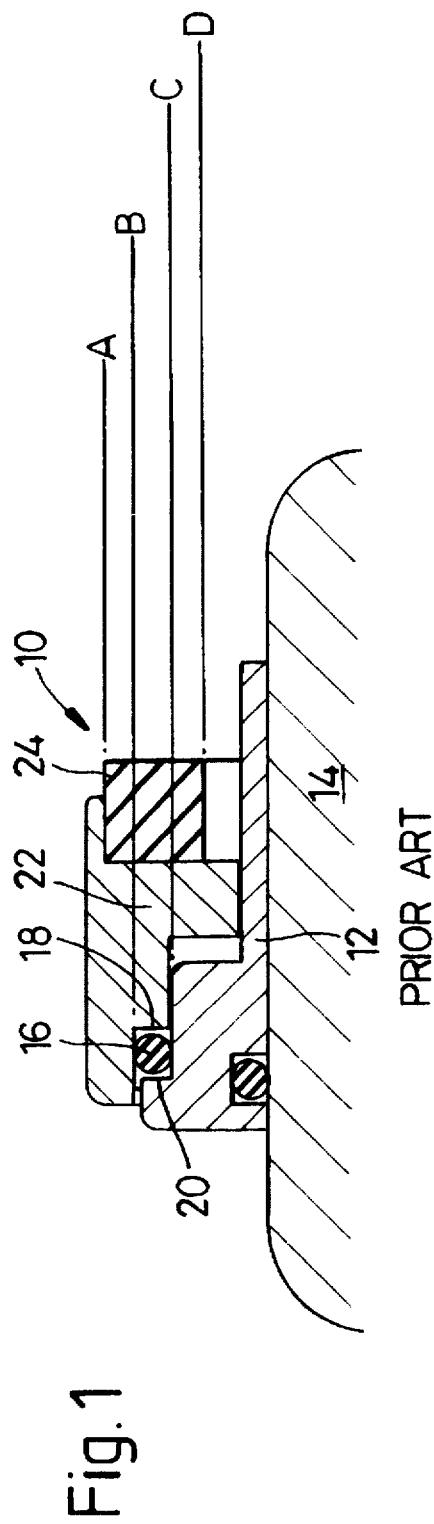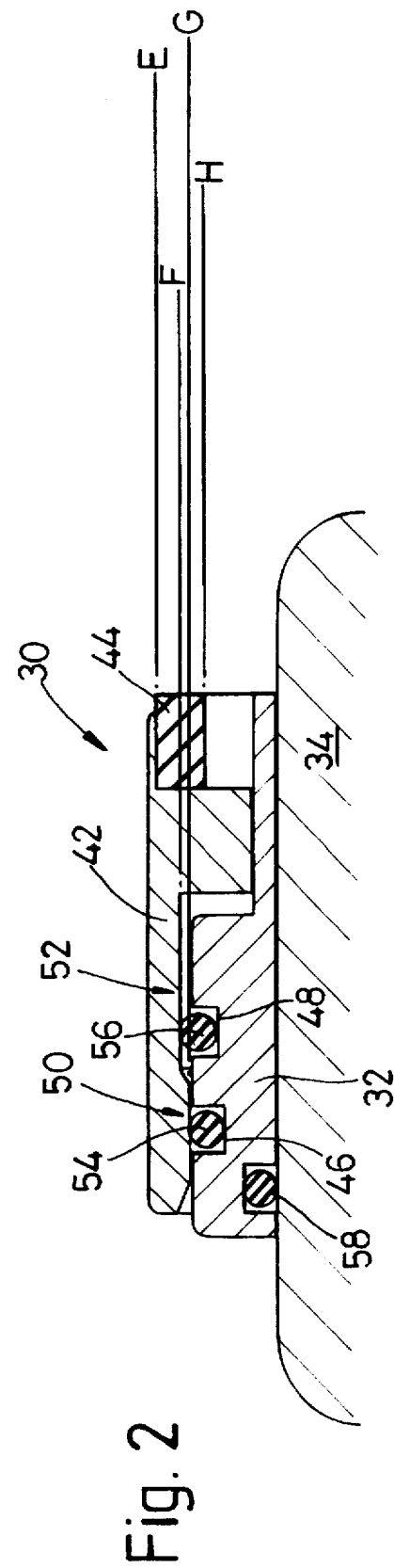

THIN FACED BALANCED SEAL

BACKGROUND OF THE INVENTION

This invention relates to improvements in mechanical seals.

So-called "double balanced" mechanical seals find application principally in the inboard seal of double mechanical seals. These seals make use of a pressurized barrier fluid between the inboard and outboard seal faces. In some circumstances, the barrier fluid pressure is relatively low, or lower than the product pressure, and in such cases, single balanced seals are often unsuitable.

However, in those applications, which require a higher barrier fluid pressure, or a barrier fluid pressure in excess of the product pressure, the seal will need to be designed such that the thrust from the barrier fluid acting to open the inboard seal faces when the product pressure disappears is minimized. This situation may rise, for example, when the rotating equipment stops running. Of course, when the product pressure is at its usual operating pressure, the thrust tending to open the seal should also be minimized. This is known as "double balancing" the seal.

FIG. 1 shows a standard double balanced seal. The seal 10 consists of a sleeve 12 which is fixed to the shaft 14 of an item of mechanical equipment. An O-ring 16 lies between a shoulder 20 on the sleeve 12 and a corresponding shoulder 18 on a rotary component 22. A rotary seal face 24 is positioned on the rotary component 22 such that 30% of its area lies radially outward of the outer diameter of the O-ring 16 and 30% of its area lies radially inward of the inner diameter of the O-ring 16. As will readily be understood, the stationary seal face, stuffing box, etc. are omitted for clarity. The net thrust acting on the rotary component 22 and hence on the rotary seal face 24 tends to close the seal faces irrespective of whether the barrier fluid pressure is in excess of or less than the product pressure as will now be explained.

Suppose the barrier fluid pressure $P_b$ is less than the product pressure $P_p$ so that there is a net pressure difference $P=P_b-P_p$ acting on the product side (left) of the rotary component 22. Since the top of the seal face 24 is exposed to product, thrusts acting on the rotary component 22 outside line A in FIG. 1 cancel one another out. Assuming that the pressure losses across the seal face 24 are linear, the hydrostatic thrust acting to open the inboard seal faces is equivalent to half the pressure P acting on the seal face 24 or all of the pressure P acting on the outer half of the seal face 24. In addition to the hydrostatic thrust, hydrodynamic forces act to open the seal faces, these being derived from rotation and shear of the film of fluid lying between the seal faces.

The hydrostatic thrust acting to close the inboard seal faces is derived from pressure P acting on the left of the rotary component 22 at all points radially outward of line C, representing the inner diameter of the O-ring 16. This is because the O-ring 16 slides into abutment with and presses upon the shoulder 18 of the rotary component 22 and effectively becomes part of it for the purposes of accounting for product pressure. Additional closing force is supplied by the springs which bias the rotary seal face 24 into contact with the stationary seal face.

Accordingly, since line C is radially inward of the midpoint of the seal face 24, the net hydrostatic thrust acting on the seal face 24 acts to close it against its corresponding stationary seal face. The amount of this thrust depends upon the proportion of the area of the seal face 24 which lies between its mid-point and line C. As an example and as shown in FIG. 1, in this case the amount is 20%.

Conversely, suppose the barrier fluid pressure $P_b$ is greater than the product pressure $P_p$, such that there is a net pressure difference $P=P_p-P_b$ acting on the barrier fluid side (right) of the rotary component 22. As the inside of the seal face 24 is exposed to barrier fluid, hydrostatic thrusts acting on the rotary component 22 inside line D of FIG. 1 cancel one another out. Again, assuming that the pressure losses across the seal faces are linear, the hydrostatic thrust acting to open the inboard seal faces is equivalent to a pressure P acting on the inner half of the seal face 24.

However, the hydrostatic thrust acting to close the inboard seal faces is derived from pressure P acting on the left of the rotary component 22 at all points radially inward of line B, representing the outer diameter of the O-ring 16. This is because the O-ring 16 slides into abutment with and presses upon the shoulder 20 of the sleeve 12 and thus is not to be taken to be a part of the rotary component 22 for the purposes of accounting for barrier fluid pressure. Fluid pressure acts against the full height of the shoulder 18 on the rotary component 22.

Accordingly, since line B is radially outward of the midpoint of the rotary seal face 24, the net hydrostatic thrust acting on the seal face 24 tends to close it against its corresponding stationary seal face. Again, the magnitude of this thrust depends upon the proportion of the area of the seal face 24 which lies between its midpoint and line B and again in the example shown in FIG. 1 this is 20%. A net hydrostatic thrust corresponding to 15% of the area of the seal face 24, acting to close the inboard seal, irrespective of whether the barrier fluid pressure is higher than the product pressure or vice versa is regarded as the standard bench mark for "double balanced" seals.

It might be thought that the percentage of seal face area lying between the mid-point of the seal face 24 and either of lines B and C could be increased by making the seal face 24 thinner. Indeed, removing the top and bottom 30% of the seal faces would increase this 20% to 50%. However, in that case the lubricating film between the rotary seal face 24 and its corresponding stationary seal face would be squeezed out, resulting in excessive wear of the seal faces. In the reverse situation, where the face area is too large, hydrodynamic forces will dominate and tend to open the seal faces, producing a leaky seal.

For this reason, 30% of the area of the seal face 24 lies outwards of the outer diameter of the O-ring 16 and 30% of the area of the seal face 24 lies inwards of the inner diameter of the O-ring 16. This in turn means that the thickness of the seal face 24 must be two and half times the thickness of the O-ring 16, which results in a relatively thick seal face 24.

However, it is known to be advantageous to use relatively thin seal faces which enables a seal 10 to be constructed which will fit into the small stuffing boxes. In addition, thin seal faces generate much less frictional heat than thick faces unless, as discussed above, the closing pressure on the seal face is too high. Where the product being sealed is close to its boiling point safety margin, thin face sealing technology will usually perform much better. However, as described above, one cannot simply make the seal face thinner because this results in excessive wear.

SUMMARY OF THE INVENTION

It is an object of the invention to provide a thin faced seal in which an acceptable balance between hydrostatic and hydrodynamic forces is produced irrespective of whether the inside or outside of the seal is at a higher pressure.

The present invention provides a mechanical seal which is capable of taking advantage of thin seal face technology and which, although not necessarily "double balanced" according to the strict, accepted meaning of the term, nevertheless gives rise to many of the advantages associated with such seals.

Accordingly, the present invention provides a cartridge mounted mechanical seal comprising a sleeve component and a rotary seal face carried by a rotary component, the seal comprising first and second sealing rings adapted to form a seal between the cooperating surfaces of first and second regions of the sleeve component and the rotary component respectively, the first region being separated from the rotary seal face by the second region, in which the diameter of the seal which the first sealing ring makes against the component against which it does not bear when acted upon by pressure external to the seal is less than the diameter of the seal which the second sealing ring makes against the component against which it does not bear when acted upon by pressure internal to the seal and in which at least one of the first and second sealing rings are sufficiently resilient to allow the second region of the sleeve to pass through the first region of the rotary component during assembly of the seal.

Preferably, the first and second sealing rings are captive in the sleeve and the first region of the rotary component has a relatively small internal diameter as compared with the second region.

The advantages of this arrangement will be discussed below with reference to FIG. 2, but it should be appreciated that the thickness of the seal face is not constrained to be a multiple of the thickness of one or other of the sealing rings.

The sealing rings may be held captive in the sleeve in grooves of different depths and in those circumstances the difference in depths of the two grooves is preferably substantially equal to the difference in internal diameter of the first and second regions.

To enable the first region of the rotary component to pass over the second sealing ring with relative ease, it is preferred that the inner surface of the first region remote from the second region be ramped. Similarly, to allow relatively easy disassembly and to prevent any damage to the second sealing ring by any sharp edges on the rotary component which otherwise exist, it is preferred that the transition between the inner surfaces of the first and second regions is ramped.

To ensure that the net thrust on the rotary seal face acts to close it against its corresponding stationary seal face, it is preferred that on the one hand at least 50% of the sealing surface of the seal face lies radially outward of the diameter of the seal which the first sealing ring makes against the component against which it does not bear when acted upon by pressure external to the seal and on the other hand at least 50% of the sealing surface of the seal face lies radially inward of the diameter of the seal which the second sealing ring makes against the component against which it does not bear when acted upon by pressure internal to the seal.

Preferably, in each case, that proportion of the sealing surface of the seal face is at most 65–85%, preferably at most 70%.

BRIEF DESCRIPTION OF THE DRAWING

In the drawing:

FIG. 1 is a cross-sectional view showing a standard double-balanced seal; and

FIG. 2 is a cross-sectional view of the thin faced balanced mechanical seal of the present invention.

DETAILED DESCRIPTION OF THE INVENTION

FIG. 2 shows a seal according to the present invention. Again, the seal 30 comprises a sleeve 32 which is fixed to the shaft 34 of a item of mechanical equipment, together with a rotary component 42 which carries a rotary seal face 44. Two O-ring grooves 46, 48 are provided on the sleeve 32, the first 46 being remote from the rotary seal face 44 and cut somewhat deeper into the sleeve 32 than the second 48. The rotary component 42 has a first region 50 remote from the rotary seal face 44, the inner surface of which has a relatively small diameter and a second region 52 between the first region 50 and the rotary seal face 44, the inner surface of which has a larger diameter. The difference in diameters of the inner surfaces of these two regions 50, 52 corresponds to the difference between the depth of the two O-ring grooves 46, 48. A pair of O-rings 54, 56 are located in the O-ring grooves 46, 48 and seal against the inner surface of the rotary component 42. Again, the stationary seal faces, stuffing box, etc. are omitted for clarity. The net thrust, if any, acting on the rotary component 42 and hence on the rotary seal face 44 tends to close the seal face irrespective of whether the barrier fluid pressure is in excess of or less than the product pressure as will now be explained.

Suppose the barrier fluid pressure $P_b$ is less than the product pressure $P_p$, such that there is a net pressure difference between $P=P_b-P_p$ acting on the product side of the rotary component 42. Because the top of the seal face 44 is exposed to product, hydrostatic thrusts acting on the rotary component 42 outside line E in FIG. 2 cancel one another out. Assuming that the pressure losses across the seal face 44 are linear, the hydrostatic thrust acting to open the inboard seal face is equivalent to the pressure P acting in the other half of the seal face 44.

However, the hydrostatic thrust acting to close the inboard seal faces is derived from pressure P acting on the left of the rotary component 42 at all points radially outward of line G, representing the outer diameter of the first O-ring 54. Because the O-ring 54 is captive in the fist O-ring groove 46, it does not become an effective part of the rotary component 42 for the purposes of accounting for product pressure.

However, since line G is radially inward of the mid-point of the seal face 44, which in this example happens to coincide with line F, the net hydrostatic thrust acting on the rotary seal face 44 tends to close it against its corresponding stationary seal face.

Conversely, suppose the barrier fluid pressure $P_b$ is greater than the product pressure $P_p$ such that there is a net pressure difference $P=P_p-P_b$ acting on the barrier fluid side of the rotary component 42. As the bottom of the seal face 44 is exposed to the barrier fluid, hydrostatic thrusts acting on the rotary component 42 radially inward of line H in FIG. 2 cancel one another out. Assuming that the pressure losses across the seal face 44 are linear, the hydrostatic thrust acting to open the inboard seal faces is equivalent to the pressure P acting on the inner half of the seal face 44.

However, the hydrostatic thrust acting to close the inboard seal faces is derived from pressure P acting on the left of the rotary component 42 at all points radially inward of line F, representing the outer diameter of the second O-ring 56. Because this O-ring 56 is captive in the second O-ring groove 48, it does not form an effective part of the rotary component 42 for the purposes of accounting for product pressure.

Accordingly, since in this example line F coincides with the mid-point of the rotary seal face 44, there is not net hydrostatic thrust acting on the seal face 44. The spring pressure will be offset by hydrodynamic forces generated during rotation of the seal. Of course, the relative dimensions of the various components could be adjusted such that the line F lies above the mid-point of the seal face 44, ensuring that there is a net hydrostatic thrust which tends to close the rotary seal face 44 against its corresponding stationary seal face in these circumstances.

The use of the two O-rings 54, 56 allows the distance between lines F and G to be reduced. The alternative would be to use a much thinner O-ring, but because commercially available O-rings only come in a limited number of thicknesses, the flexibility of that approach would be restricted. As can be seen from FIG. 2, it is a relatively simple matter to arrange for at least 30% of the area of the seal to lie inward of line G or outward of line F as the case may be.

The components of the seal 30 illustrated in FIG. 2 can be assembled with relative ease. Firstly, the sleeve 32 is attached to the shaft 34, together with its captive O-ring 58. The attachment may be by means of a grub screw. Next the first and second O-rings 54, 56 are placed in position in the fist and second grooves 46, 48 in the sleeve 32 and then the rotary component 42 slid into the place illustrated in FIG. 2 from the right. It is only because the second O-ring 56 is sufficiently resilient to allow itself to be compressed down to the sleeve of the outer diameter of the sleeve 32 that the components are able to be assembled as shown at all.

Once it is appreciated that it is possible to slide the relatively small diameter of the inner surface of the first region 50 of the rotary component 42 over what is effectively a larger diameter, namely the outer diameter of the second O-ring 56, one can select the appropriate diameters of O-rings 54, 56 and regions of the rotary component 42 to match the thickness of seal face 44 desired. In the example shown, the seal face 44 can be seen to be much thinner than that illustrated in FIG. 1, enabling the seal 30 to fit within a smaller stuffing box than is possible with the seal 10 of FIG. 1. Furthermore, it will be appreciated that the O-rings 54, 56 may be held captive in the rotary component rather than the sleeve, with the sleeve having a first region of relatively large external diameter.

I claim:

1. A cartridge-mounted mechanical seal comprising:
   a sleeve component; and
   a rotary component carrying a rotary seal face;
   said sleeve component having an outer surface portion comprising first and second surface regions, said rotary component having an inner surface portion comprising first and second surface regions, said first surface regions and said second surface regions of said sleeve component and said rotary component being opposed respectively;
   a first sealing ring forming a first seal between said first regions of said sleeve component and said rotary component, said first sealing ring being captively seated within one of said sleeve and rotary components constrained against axial motion, said first sealing ring forming said first seal of a first diameter;
   a second sealing ring forming a second seal between said second regions of said sleeve component and said rotary component, said second sealing ring being captively seated within one of said sleeve and rotary components thereby being constrained against axial motion, said second sealing ring forming said second seal of a second diameter;
   said first diameter being less than said second diameter;
   said first surface region of said rotary component being separated from said rotary seal face by said second surface region of said rotary component; and
   said second surface region of the sleeve component being able to pass through said first surface region of the rotary component during assembly of the seal.

2. A cartridge-mounted mechanical seal according to claim 1 in which the first and second sealing rings are captive in the sleeve component and the first region of the rotary component has a relatively small internal diameter as compared with the second region there of.

3. A seal according to claim 1 in which the sealing rings are held captive in the sleeve in grooves of different depths.

4. A seal according to claim 3 in which the difference in depths of the two grooves is substantially equal to the difference in internal diameters of the first and second regions of said rotary component.

5. A seal according to claim 2 in which a portion of the inner surface of the first region of the sleeve component remote from the second region of the sleeve component is ramped.

6. A seal according to claim 2 in which the inner surface of the sleeve component between the first and second regions of the sleeve component is ramped.

7. A seal according to claim 1 in which at least 50% of the sealing surface of the seal face lies radially outward of the first diameter.

8. A seal according to claim 1 in which at most 85% of the sealing surface of the seal face lies radially outward of the first diameter.

9. A seal according to claim 1 in which at least 50% and at most 85% of the sealing surface of the seal face lies radially outward of the first diameter.

10. A seal according to claim 1 in which at least 50% of the sealing surface of the seal face lies radially inward of the second diameter.

11. A seal according to claim 1 in which at most 85% of the sealing surface of the seal face lies radially inward of the second diameter.

12. A seal according to claim 1 in which at least 50% and at most 85% of the sealing surface of the seal face lies radially inward of the second diameter.

13. A seal according to claim 1 in which at most 70% of the sealing surface of the seal face lies radially outward of the first diameter.

14. A seal according to claim 1 in which at least 50% and at most 70% of the sealing surface of the seal face lies radially outward of the first diameter.

15. A seal according to claim 1 in which at most 70% of the sealing surface of the seal face lies radially inward of the second diameter.

16. A seal according to claim 1 in which at least 50% and at most 70% of the sealing surface of the seal face lies radially inward of the second diameter.

17. A seal according to claim 1 in which at most 65% of the sealing surface of the seal face lies radially outward of the first diameter.

18. A seal according to claim 1 in which at least 50% and at most 65% of the sealing surface of the seal face lies radially outward of the first diameter.

19. A seal according to claim 1 in which at most 65% of the sealing surface of the seal face lies radially inward of the second diameter.

20. A seal according to claim 1 in which at least 50% and at most 65% of the sealing surface of the seal face lies radially inward of the second diameter.

* * * * *